United States Patent
Penzin

(10) Patent No.: US 10,192,047 B2
(45) Date of Patent: Jan. 29, 2019

(54) PROVISIONING OF IDENTITY INFORMATION

(71) Applicant: Cisco Technology, Inc., San Jose, CA (US)

(72) Inventor: Vadim Penzin, Tekoa (IL)

(73) Assignee: Cisco Technology, Inc., San Jose, CA (US)

(*) Notice: Subject to any disclaimer, the term of this patent is extended or adjusted under 35 U.S.C. 154(b) by 333 days.

(21) Appl. No.: 15/194,626

(22) Filed: Jun. 28, 2016

(65) Prior Publication Data

US 2017/0372061 A1 Dec. 28, 2017

(51) Int. Cl.

| | | |
|---|---|---|
| *G06F 21/44* | (2013.01) | |
| *H04L 9/00* | (2006.01) | |
| *H04L 9/30* | (2006.01) | |
| *H04L 9/14* | (2006.01) | |
| *H04L 9/06* | (2006.01) | |
| *H04L 9/32* | (2006.01) | |
| *G06F 21/57* | (2013.01) | |
| *G06F 9/455* | (2018.01) | |

(52) U.S. Cl.
CPC .......... *G06F 21/44* (2013.01); *G06F 9/45558* (2013.01); *G06F 21/575* (2013.01); *H04L 9/006* (2013.01); *H04L 9/0643* (2013.01); *H04L 9/14* (2013.01); *H04L 9/302* (2013.01); *H04L 9/3239* (2013.01); *H04L 9/3249* (2013.01); *G06F 2009/45562* (2013.01); *G06F 2009/45587* (2013.01)

(58) Field of Classification Search
CPC .... G06F 21/44; G06F 9/45558; G06F 21/575; H04L 9/006; H04L 9/0643; H04L 9/14; H04L 9/302; H04L 9/3239; H04L 9/3249
See application file for complete search history.

(56) References Cited

U.S. PATENT DOCUMENTS

| | | |
|---|---|---|
| 8,869,300 B2 | 10/2014 | Singh et al. |
| 9,158,909 B2 | 10/2015 | Doane et al. |
| 9,264,220 B2 | 2/2016 | Gerhrmann et al. |
| 2010/0161998 A1* | 6/2010 | Chen ............ G06F 21/57 713/189 |
| 2013/0227089 A1 | 8/2013 | McLeod et al. |

(Continued)

OTHER PUBLICATIONS

Thales (nShield Security Policy, Nov. 12, 2015, 55 pages) (Year: 2015).*

(Continued)

*Primary Examiner* — Oleg Korsak

(57) ABSTRACT

In one embodiment, a file comprising a disk image and a key blob is prepared. The file is attached to a virtual machine configuration. A virtual machine based on the virtual machine configuration is launched. A kernel is paired to the key blob by a kernel driver paired to the key blob reading secret comprising identity information into the kernel of the virtual machine. The identity information is registered with a kernel service. The attached file is ejected from the virtual machine configuration. The identity information is accessed by an application running on the virtual machine, wherein the identity information is used by the application when the kernel service requires identity information. Related hardware and systems are also described.

20 Claims, 3 Drawing Sheets

(56) References Cited

U.S. PATENT DOCUMENTS

2016/0140343 A1* 5/2016 Novak .................. G06F 21/575
713/2

OTHER PUBLICATIONS

David Grayson (Practical Windows Code and Driver Signing, web.archive.org Dec. 9, 2015, 17 pages) (Year: 2015).*
TCG (TPM Main Part 1 Design Principles, Specification Version 1.2, Jul. 9, 2007, 182 pages) (Year: 2007).*
Amdisen, Martin; "Self-Configuration and the OVF Environment"; in Vmware vAPP Developer Blog posted Jul. 14, 2009.
Gebhardt. Carl et al.; Secure Virtual Disk Images for Grid Computing (IEEE), Jan. 1, 2008.
Kernel Key Retention Service in Linux-Kernel-Archives; Nov. 9, 2015.

* cited by examiner

PROVISIONING OF IDENTITY INFORMATION

TECHNICAL FIELD

The present disclosure generally relates to methods and systems for securely identifying cloud based applications.

BACKGROUND

There has been a move in recent years in computing toward using virtualized technologies. Using virtualized technologies typically requires utilizing a hypervisor, or virtual machine monitor (VMM) operating on a host machine to run at least one virtual, or guest, machine. The hypervisor provides the guest machine's operating systems with a virtual operating platform in order to manage the execution of guest machine operating systems.

Hypervisor technology may be used by malware and rootkits which install themselves as a hypervisor below the operating system. This may render the malware or rootkit more difficult to detect because the malware could intercept operations of the operating system (such as someone entering a password) without the anti-malware software necessarily detecting it (since the malware runs below the entire operating system).

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a file comprising a disk image and a key blob is prepared. The file is attached to a virtual machine configuration. A virtual machine based on the virtual machine configuration is launched. A kernel is paired to the key blob by a kernel driver paired to the key blob reading secret comprising identity information into the kernel of the virtual machine. The identity information is registered with a kernel service. The attached file is ejected from the virtual machine configuration. The identity information is accessed by an application running on the virtual machine, wherein the identity information is used by the application when the kernel service requires identity information. Related hardware and systems are also described.

Example Embodiments

Figure 1:
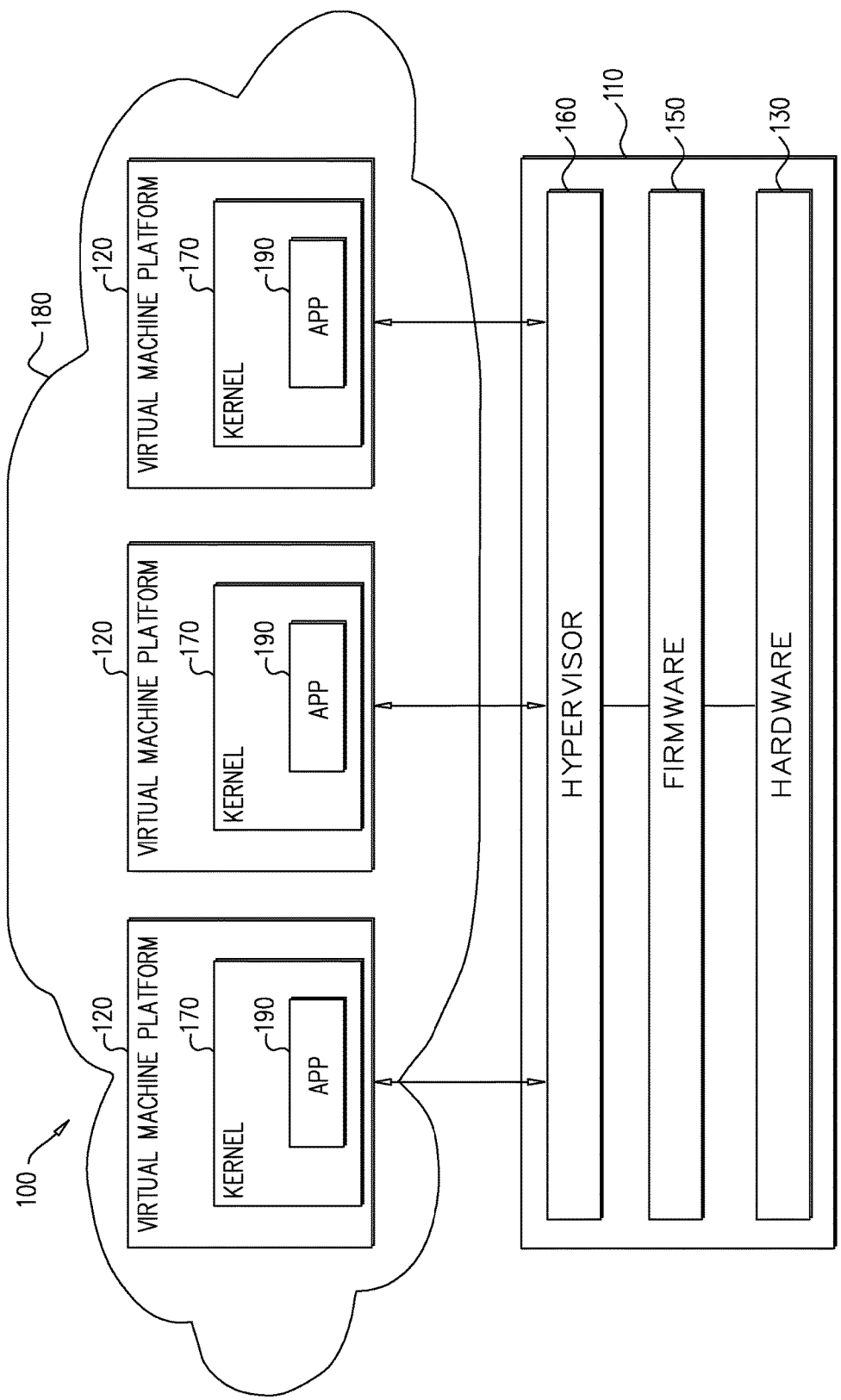
FIG. 1 is a simplified block diagram illustration of an arrangement for secure provisioning of virtual machine identity information for cloud computing constructed and operative in accordance with an embodiment.

Reference is now made to FIG. 1, which is a simplified pictorial illustration of a system 100 for secure provisioning of virtual machine identity information for cloud computing constructed and operative in accordance with an embodiment.

A host system 110 is a platform on which several virtual machine (VM) 120 platforms may run simultaneously. The host system includes hardware 130 comprising a processor, which may be a single CPU (Central processing unit), or could comprise two or more processing units. For example, the processor may include general purpose microprocessors, instruction set processors and/or related chips sets and/or special purpose microprocessors such as ASICs (Application Specific Integrated Circuit). The processor may also comprise board memory for caching purposes. The hardware 130 further comprises memory, which may, for example, be a flash memory, a RAM (Random-access memory), a ROM (Read-Only Memory) or an EEPROM (Electrically Erasable Programmable ROM). The hardware 130 may further comprise a network interface, input device(s), output device(s), and/or mass storage device(s), and so forth.

The host system 110 further comprises a firmware module 150 which may be implemented as machine accessible instructions to boot the host system 110. The firmware 150 may be part of or include the basic input/output system (BIOS) of the host system 110.

The host system 110, according to the exemplifying embodiment shown in FIG. 1, further comprises a hypervisor 160 or Virtual Machine Monitor (VMM), which may be a firmware or a software component that is configured to enable multiple Virtual Machines (VMs), such as VM 120 platforms, running simultaneously. The hypervisor 160 ensures that the operation of each of the plurality of VMs 120 does not interrupt the operation of any other VM 120. As previously mentioned, the advantages of having a plurality of VMs 120 running simultaneously on the same hardware however also create risks. The hypervisor 160 is exposed to threats both from external and internal sources and if the hypervisor 160 is compromised this potentially could adversely affect the whole system 100.

As noted above, the host system 110 of the embodiment disclosed with reference to FIG. 1 supports a plurality of VM 120 platforms. Each of the plurality of VM 120 platforms may operate like a complete physical machine that runs an operating system (kernel) 170.

In order to enable running an application 190 in a virtual environment 180 on VMs 120, the VMs 120 should be reliably and securely identified. Such secure identification of the VMs 120 enables, at least (but not limited to), secure communications between applications 190 running on different VMs 120 in the virtual environment 180. Accordingly, a protected set of secrets is provided to each VM 120. These secrets are specific to each running instance of each VM 120.

The physical host system 110 comprising the hypervisor 160 implements a hardware-assisted chain of trust. Typically, it is the case that an operating system operating in the host system 110 which is used to launch virtual machines is a hardened operating system. That is to say the operating system operating in the host system 110 has, for example, had its vulnerabilities reduced, by techniques known in the art, for example, and without limiting the generality of the foregoing, by removing unnecessary usernames and logins; removing unnecessary software; disabling or removing unnecessary services, and so forth.

The software which is instantiated to activate each of the VMs 120 is assumed, for the purposes of the following discussion, to be protected using public key cryptography. This is true for both the kernel 170 as well as any immutable part of a root file system of the VM 120. As will be explained below in greater detail, the VM 120 is instantiated in an orderly fashion in which an access control system oversees which VM 120 is to be launched, and ensures that the launching processes is authorized to execute the launch, when the launching processes is authorized to execute the launch, and for how long the VM 120 is to be instantiated. The access control system also verifies which processes are authorized to terminate execution of the VM 120. The access control process is part of the hypervisor 160, which verifies the authenticity of any VM 120 which is to be launched using public key cryptographic techniques known in the art. The kernel 170 is typically verified as well by the hypervisor 160 as soon as the kernel is loaded into RAM and prior to its actual launch.

The hypervisor 160 additionally protects physical memory pages that belong to the virtual kernel 170 from unauthorized access with the aid of a memory management unit (MMU) implemented in the hardware 130 of the physical host. It is appreciated that although there may be software defects in the virtual kernel 170 that facilitate unauthorized access to memory that belongs to the virtual kernel from the virtual user space, such defects are typically quite rare, public, and dealt with by the hypervisor 160 promptly.

The VM 120, once running, in its virtual user space is not trusted. The user space system and application software, even though they originate from an authentic, verified image, may comprise software defects and thereby become a subject of attacks immediately upon start of the VM 120. Accordingly, the user space system and application software should not be used to bring secrets into the VM 120. There is no instance-specific identifier of the VM 120 (i.e., a certificate). Additionally, the user space system and application software may itself be corrupted due to attacks and software defects. Accordingly, secrets coming from the VM 120 themselves might be compromised.

Figure 2:
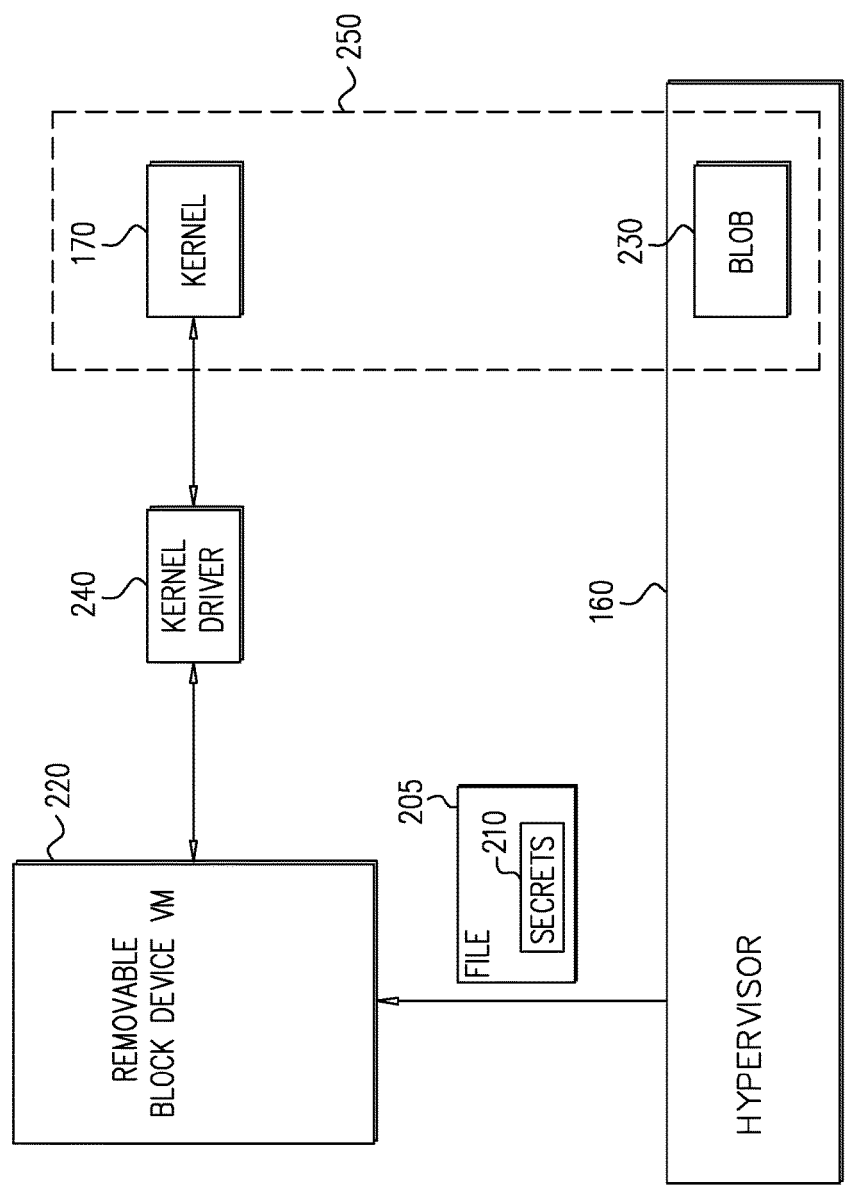
FIG. 2 is a simplified block diagram illustration of key blob—virtual machine pairing in the system of FIG. 1.

Reference is now made to FIG. 2, which is simplified block diagram illustration of key blob 230—kernel 170 in the system of FIG. 1. A set of secrets are delivered from the hypervisor 160 directly into the launched virtual kernel 170 during the initialization of the kernel 170.

It is appreciated that references to the Linux operating system above are by way of example. Embodiments may be implemented which do not utilize GPL symbols of the Linux kernel.

The set of secrets are delivered before the kernel 170 spawns the init(8) process. As is known in the art, the init(8) process is the first process that runs in the VM 120 user space. An event base init daemon, init(8) is the parent of all processes on a given system. Because init(8) is an event-based init daemon, jobs created by init(8) will be automatically started and stopped by changes that occur to the system state, including as a result of jobs starting and stopping. In contrast, dependency based daemons start a specific set of goal jobs, and resolve the order in which they should be started and other jobs required by iterating their dependencies.

Specifically, a file 205, such as a disk image is prepared. The file 205 contains a set of secrets 210. For instance, the file 205 may contain identity information for instances of VM 120 platforms which are to be launched.

The hypervisor 160 attaches the file to the configuration of an instance of the VM 120 that is to be launched as a removable block device 220 (a CD-ROM, a USB mass-storage device, etc.). Virtual media which is to be read by the removable block device 220 is hereinafter referred to as a "volume". For example, if the VM is launched as the removable block device 220 is a virtual CD-ROM, then the media which is read by the virtual CD-ROM is the volume.

AN operator, such as an external agency, such as a human or a computer implemented mechanism provides a key blob 230 containing a set of keys that are used for protection of volumes to the hypervisor 160 for generating the secrets such as the identity information for instances of VM 120 platforms. The key Binary Large OBject—BLOB—provides a way to store a key which contains a set of keys and function as a medium used to add a layer of security when transferring a key from one provider to another. The key blob 230 may contain the following set of keys, for instance:

An RSA 2048-bit key (n, e, and d) that is used for authentication of a volume;

An HMAC-SHA-256 secret (h) that is used for verification of integrity of a volume; and An AES-256 key (s) that is used for encryption of a volume.

Access to the key blob 230 is typically protected by utilizing a key passphrase. The key blob 230 may itself be protected using a keyed-hash message authentication code, such as HMAC-SHA-256. Furthermore, the key blob 230 may itself be encrypted using AES-256-CBC. In some embodiments, the effective key blob 230 encryption key and the effective HMAC secret are derived from the key passphrase.

The virtual kernel 170, for example, a virtual Linux kernel, is able to decrypt a volume and authenticate the contents of the decrypted volume. Accordingly, n, e, h, and s are exported from the key blob 230 in the form of source file 205, for instance, a source file in the C programming language. A kernel driver 240 is then built by the operator using the source file 205. The kernel 170, which is instantiated with the kernel driver 240 is then paired to the key blob 230, indicated by block 250. Said kernel 170 is, accordingly, capable of importing secrets 210 contained in any volume that is protected using its particular paired key blob 230 (block 250). Once the kernel 170 is instantiated, and preferably as soon as the kernel 170 is instantiated, the operator will cryptographically sign the kernel 170 using a dedicated PKI key, and then store the signed kernel 170 on an encrypted disk.

A volume manifest describing the contents of the volume, and thereby implicitly specifying the process of volume mastering, is then written by the operator. Manifests are expressed in a domain-specific language that set attributes for every secret and also support specification of possible mechanisms of obtaining secrets. For example, and without limiting the generality of the foregoing, the following are possible mechanisms of obtaining the secrets:

Inline text (for human-readable data) or hexadecimal strings (for binary data);

Data read from URLs (typically file and https schemes, the latter implies mandatory bilateral TLS (transport layer security) authentication); and Mastering-time evaluation of arbitrary expressions in the underlying programming language.

It is appreciated that in some embodiments, the volume manifest may be signed with an appropriate digital signature. Optionally, some embodiments may implement the volume manifest and key blob 230 as being sealed with Trusted Platform Module (TPM) chips. That is to say, the data of the volume manifest and the key blob 230 is encrypted using a unique RSA key, but may only be decrypted when the TPM chip is in a particular specified state. In some embodiments, volumes may be chained, i.e. a first volume may have the key for a second volume, which in turn holds the key for a third volume, and so forth.

An volume manifest interpreter is provided with inputs of: the volume manifest, the key blob 230, and the key blob passphrase. Upon completion of volume mastering by the volume manifest interpreter, the volume manifest interpreter then computes its HMAC-SHA-256 digest using h. The volume manifests interpreter then signs the digest using d. Once signing is completed, the volume manifest interpreter then concatenates the volume, the digest, and the signature and finally encrypts the catenation using s.

The signed encrypted volume is, for security reasons, kept separately from its paired kernel 170. Since the volume is both signed and encrypted, it is possible to transmit the volume over an untrusted public network.

In some embodiments, the volume is structured to be compatible with existing Linux block-encrypted storage infrastructure. In terms of the dm-crypt disk encryption subsystem in use in Linux, the signed encrypted volume is an ESSIV (SHA-256) volume encrypted with AES-256-CBC. Accordingly, when s is available, for instance, ifs were to have been exported from the key blob 230 that was used during mastering of the particular volume, it is then possible to use the utilities cryptsetup(8) and dd(1) for examination of unencrypted contents of that particular volume on any Linux distribution having Linux kernel version 2.6 and later. Nevertheless, the kernel driver does not itself rely on dm-crypt during its operation.

The hypervisor 160 then launches the VM 120 as the removable block device 220. The kernel 170 of the VM 120 then assumes control of the VM 120.

The hypervisor 160 then attaches the volume to the removable block device 220, such as a virtual CD-ROM, as described above. The VM 120 is then launched with the paired kernel with the name of the virtual removable block device 220 as a parameter on the kernel command line. The kernel 170 (which is paired, in block 250, to the key blob 230) then launches the kernel driver 240. The kernel driver 240 decrypts the volume using s, verifies the integrity of the volume using h, and checks the volume's authenticity using n and e. The kernel driver 240 then sends commands to the removable block device 220 in order to eject the volume from the drive and deletes the kernel object that represents the removable block device 220.

The kernel driver 240 situated at the guest operating system reads the identity information from the removable block device 220 into the kernel 170 of the VM 120.

The kernel driver 240 then registers the identity information with a system service of the kernel 170 that distributes identity information to the user-space processes (for instance, the Linux Kernel Key Retention Service).

The file 205 which has been read into the removable block device 220 is then ejected from the block device. The removable block device 220 itself may also optionally be unregistered as a VM 120. The kernel driver 240 may also optionally be unloaded from the guest operating system.

It is appreciated that when the kernel driver 240 commands the virtual removable block device 220 to eject the volume, the volume disk image is permanently dissociated from the virtual drive (i.e. the removable block device 220). At the present time virtual CD-ROM drivers, for example, do not support loading media. Even if, at some future time, loading media will be supported by virtual CD-ROM drivers, in the case of loading the volumes, as described herein above, in order to re-associate a disk image with a virtual CD-ROM driver's instance, the operator of the hypervisor 160 typically will intervene outside of the running VM 120. Furthermore, when the kernel driver 240 deletes the kernel object that represents a CD-ROM drive, the kernel driver 240 keeps the reference count of this kernel object positive. Accordingly, the virtual kernel 170 considers its generic SCSI CD-ROM driver busy and prevents its re-loading. This mechanism prevents an attempt by an attacker to re-instantiate the drive in the system.

The kernel driver 240 may be operative to protect secrets from accidental leaks of plain-text kernel 170 memory into the user space and from attempts of running regular expression matchers against kernel memory. Secrets may be identified by their description strings. As such, the kernel driver 240 does not store these strings but their SHA-256 digests. The kernel driver 240 may implement local re-encryption of payload of secrets using AES-256-CBC with a random key. Furthermore, the kernel driver 240 may decrypt the payload of a single secret only when that secret is accessed by an authorized user-space process. Additionally, the kernel driver 240 keeps the local key in a static kernel segment, away from dynamically allocated pages where the secrets' payload is stored.

In Linux systems, the kernel driver permits user-space system and application software to access secrets, subject to access control and expiration of secrets, through the standard Linux kernel Key Retention Service (KRS). The user space interface to access the secrets is, within the KRS, request_key(2). It is appreciated that in such cases, interpretation of the payload depends on the entity that accesses the key using request_key(2). It is also appreciated that the payload is arbitrary, ranging from short passwords and certificates to binary executables and file archives.

The kernel driver 240 may implement a pseudo file system (PFS) that is intended to provide file access to secrets by software which is incapable of using KRS. In the volume manifest, any particular secret can be marked as exported through the PFS. The PFS is typically implemented as a flat file system having only one root directory. The PFS, for security reasons, does not implement directory lookup. Access control and expiration of secrets are both enforced through PFS. By way of example, a file may disappear from a mounted instance of PFS when a secret expires—i.e. since the secret, and hence, the key no longer exists, therefore, the file is no longer available.

Initialization of the guest operating system is then completed.

The application 190 (FIG. 1) software then accesses its identity information through the system service subject to any access control mechanisms enforced by that service. The system service then enforces access control to the identity information and automatic expiration of the identity information (for example, based on the system time or an access count).

Figure 3:
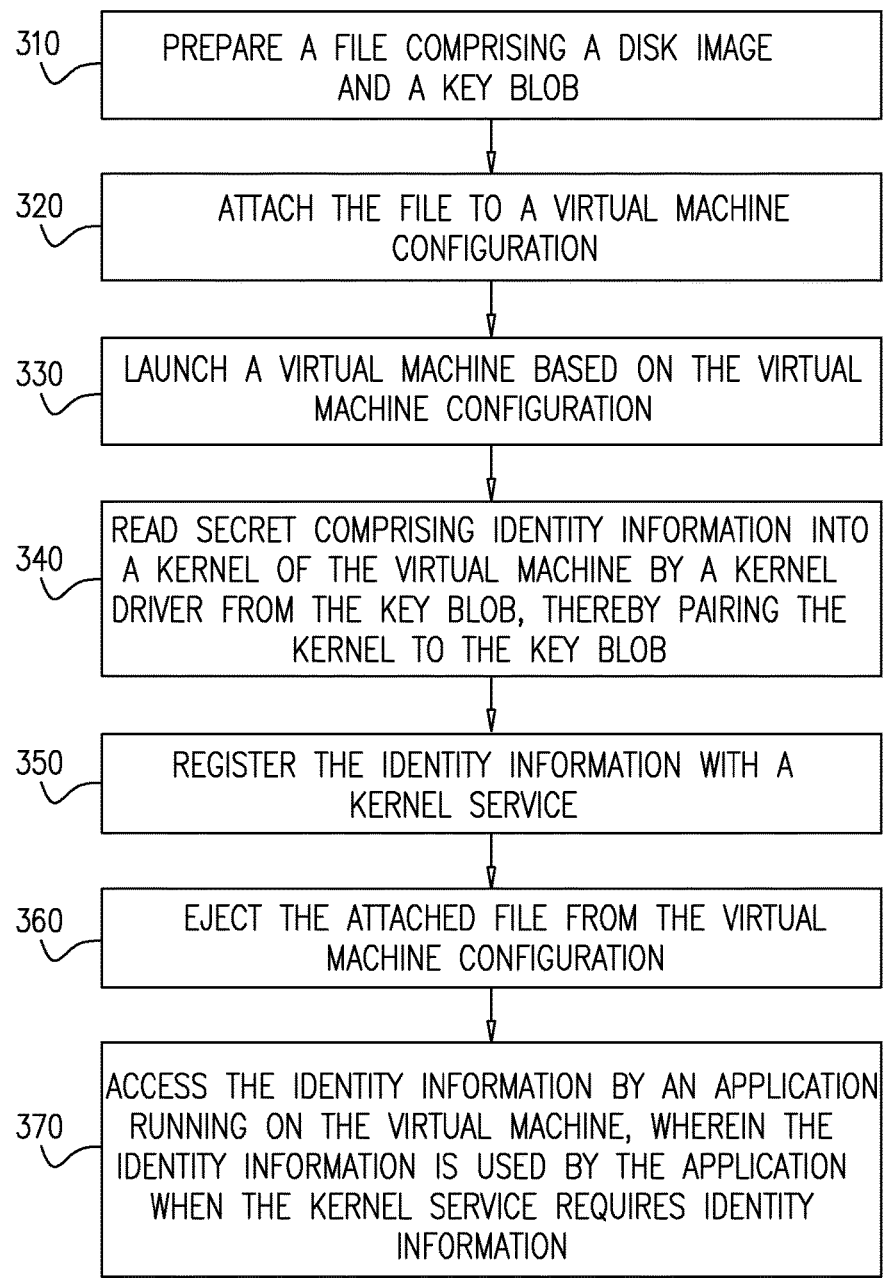
FIG. 3 is a simplified flowchart diagram of one method of operation of the system of FIG. 1.

Reference is now made to FIG. 3, which is a simplified flowchart diagram of one method of operation of the system of FIG. 1. In step 310, a file comprising a disk image and a key blob is prepared. The file may comprise a set of secrets, such as identity information for instances of VM 120 (FIG. 1) platforms which are to be launched. The file is then attached to a virtual machine configuration (step 320). A virtual machine based on the virtual machine configuration is then launched (step 330) as the removable block device 220 of FIG. 2 (e.g., a CD-ROM, a USB mass-storage device, etc.). In step 340, the secret comprising identity information is read into a kernel of the virtual machine by a kernel driver from the key blob, thereby pairing the kernel to the key blob. The key blob may comprise at least an RSA 2048-bit key, an HMAC-SHA-256 secret, and an AES-256 key. The identity information is then registered with a kernel service (step 350) for distribution of the identity information to the user-space processes. The attached file is then ejected from the virtual machine configuration (step 360). Finally, in step 370, the identity information is accessed by an application running on the virtual machine, wherein the identity information is used by the application when the kernel service requires identity information.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
preparing a file including a set of secrets comprising identity information for one or more instances of virtual machines;
attaching the file to a virtual machine configuration;
launching a virtual machine based on the virtual machine configuration;
providing a key blob including a set of keys used to generate the set of secrets;
pairing a kernel to the key blob by a kernel driver;
upon pairing the kernel to the key blob, reading the set of secrets comprising identity information for the virtual machine into the kernel of the virtual machine using the set of keys from the paired key blob;
registering the identity information for the virtual machine with a kernel service;
ejecting the attached file from the virtual machine configuration; and
accessing the identity information for the virtual machine by an application running on the virtual machine,
wherein the identity information for the virtual machine is used by the application when the kernel service requires identity information.

2. The method according to claim 1 wherein the pairing comprises using a Rivest-Shamir-Adleman (RSA) key to prepare the key blob.

3. The method according to claim 1 wherein the pairing comprises using an Hash-Based Message Authentication Code Secure Hash Algorithm (HMAC-SHA) secret to prepare the key blob.

4. The method according to claim 1 wherein the pairing comprises using an Advanced Encryption Standard (AES) key to prepare the key blob.

5. The method according to claim 1 and further comprising building the kernel driver using the prepared file.

6. The method according to claim 1 and further comprising digitally signing the kernel using a dedicated Public Key Infrastructure (PKI) key.

7. The method according to claim 6 wherein the signed kernel is stored on an encrypted disk.

8. The method according to claim 1 and further comprising sealing a volume manifest and the set of secrets with a trusted platform module chip.

9. The method according to claim 8 wherein the trusted platform module chip is encrypted using a unique Rivest-Shamir-Adleman (RSA) key.

10. The method according to claim 8 wherein a volume prepared according to the volume manifest comprises a digitally signed encrypted volume manifest.

11. The method according to claim 10 wherein the digitally signed encrypted volume manifest is kept separately from the kernel to which it is paired.

12. The method according to claim 10 wherein the volume is transmitted over a public network.

13. A system comprising:
a host system comprising at least a processor and a memory, the host system configured to execute one or more instances of virtual machines, wherein the host system further includes:
a file including a set of secrets comprising identity information for the one or more instances of virtual machines;
a virtual machine configuration to which the file is attached;
a virtual machine which is launched based on the virtual machine configuration;
a key blob including a set of keys used to generate the set of secrets;
a kernel driver which is operational to pair a kernel of the virtual machine to the key blob, wherein upon pairing the kernel to the key blob, reading the set of secrets comprising identity information for the virtual machine into the kernel of the virtual machine using the set of keys from the paired key blob;
a kernel service with which the identity information for the virtual machine is registered; and
the virtual machine being configured to eject the attached file,
wherein the identity information for the virtual machine is used by an application running on the virtual machine when the kernel service requires identity information.

14. The system according to claim 12 wherein the kernel driver which is operational to pair the kernel of the virtual machine to the key blob uses a Rivest-Shamir-Adleman (RSA) key to prepare the key blob.

15. The system according to claim 12 wherein the kernel driver which is operational to pair the kernel of the virtual machine to the key blob uses at least one of:
an Hash-Based Message Authentication Code Secure Hash Algorithm (HMAC-SHA) secret to prepare the key blob; and
an Advanced Encryption Standard (AES) key to prepare the key blob.

16. The system according to claim 12 wherein the kernel driver is built using the prepared file.

17. The system according to claim 12 wherein the kernel is digitally signed using a dedicated Public Key Infrastructure (PKI) key.

18. The system according to claim 17 wherein the signed kernel is stored on an encrypted disk.

19. The system according to claim 12 wherein a volume manifest and the set of secrets are sealed with a trusted platform module chip.

20. A non-transitory computer readable medium containing program instructions for causing a computer to perform the method of:
- preparing a file including a set of secrets comprising identity information for one or more instances of virtual machines;
- attaching the file to a virtual machine configuration;
- launching a virtual machine based on the virtual machine configuration;
- providing a key blob including a set of keys used to generate the set of secrets;
- pairing a kernel to the key blob by a kernel driver;
- upon pairing the kernel to the key blob, reading the set of secrets comprising identity information for the virtual machine into the kernel of the virtual machine using the set of keys from the paired key blob;
- registering the identity information for the virtual machine with a kernel service;
- ejecting the attached file from the virtual machine configuration; and
- accessing the identity information for the virtual machine by an application running on the virtual machine,
- wherein the identity information for the virtual machine is used by the application when the kernel service requires identity information.

\* \* \* \* \*